US011257085B1

(12) United States Patent
Barkas

(10) Patent No.: US 11,257,085 B1
(45) Date of Patent: Feb. 22, 2022

(54) SYSTEMS AND METHODS FOR AUTHENTICATION DEVICE-ASSISTED TRANSACTIONS

(71) Applicant: Wells Fargo Bank, N.A., San Francisco, CA (US)

(72) Inventor: Sotirios K. Barkas, San Jose, CA (US)

(73) Assignee: Wells Fargo Bank, N.A, San Francisco, CA (US)

( * ) Notice: Subject to any disclaimer, the term of this patent is extended or adjusted under 35 U.S.C. 154(b) by 830 days.

(21) Appl. No.: 15/016,069

(22) Filed: Feb. 4, 2016

Related U.S. Application Data

(63) Continuation of application No. 14/967,168, filed on Dec. 11, 2015, now abandoned.

(51) Int. Cl.
  *G06Q 20/40* (2012.01)
  *G06Q 20/38* (2012.01)
  *G06Q 20/36* (2012.01)
  *G06Q 20/32* (2012.01)

(52) U.S. Cl.
  CPC ... *G06Q 20/40145* (2013.01); *G06Q 20/3223* (2013.01); *G06Q 20/36* (2013.01); *G06Q 20/3829* (2013.01); *G06Q 2220/00* (2013.01)

(58) Field of Classification Search
  None
  See application file for complete search history.

(56) References Cited

U.S. PATENT DOCUMENTS

| | | | | |
|---|---|---|---|---|
| 7,450,010 | B1* | 11/2008 | Gravelle | G06F 21/606 |
| | | | | 340/572.1 |
| 7,500,616 | B2* | 3/2009 | Beenau | G06F 16/381 |
| | | | | 235/487 |
| 9,032,498 | B1* | 5/2015 | Ben Ayed | G06F 21/35 |
| | | | | 726/9 |
| 10,885,525 | B1* | 1/2021 | Sharafi | G06F 21/32 |
| 2002/0073046 | A1* | 6/2002 | David | G06Q 20/12 |
| | | | | 705/67 |
| 2002/0133467 | A1* | 9/2002 | Hobson | G06Q 20/04 |
| | | | | 705/64 |
| 2003/0028481 | A1* | 2/2003 | Flitcroft | G07F 19/00 |
| | | | | 705/39 |

(Continued)

OTHER PUBLICATIONS

Al-Chalabi et al (A Wearable and Ubiquitous NFC Wallet) (Year: 2015).*

*Primary Examiner* — Mamon Obeid
(74) *Attorney, Agent, or Firm* — Foley & Lardner LLP

(57) ABSTRACT

Methods and systems of authorizing transaction requests are disclosed. A financial institution computing system includes a network circuit exchanging information over a network, a customer database storing financial and identification code information for a plurality of customers, and a transaction circuit. The transaction circuit receives a transaction request over the network that specifies a financial account and includes a first identification code provided by an authentication device in conjunction with a separate customer computing device. The transaction circuit authenticates the transaction request by determining whether the first identification code is associated with an authorized user of the financial account specified in the transaction request, authorizes the transaction request, and transmits a confirmation to a transaction terminal over the network via the network circuit.

14 Claims, 5 Drawing Sheets

(56) References Cited

U.S. PATENT DOCUMENTS

| | | | | |
|---|---|---|---|---|
| 2004/0257197 A1* | 12/2004 | Beenau | G06Q 20/32 | 340/5.53 |
| 2006/0206709 A1* | 9/2006 | Labrou | G06Q 20/4014 | 713/167 |
| 2007/0118745 A1* | 5/2007 | Buer | G06F 21/34 | 713/168 |
| 2007/0150415 A1* | 6/2007 | Bundy | H04L 9/0866 | 705/51 |
| 2007/0299782 A1* | 12/2007 | Beenau | H04L 63/0861 | 705/64 |
| 2009/0024506 A1* | 1/2009 | Houri | G06Q 20/40 | 705/35 |
| 2009/0048953 A1* | 2/2009 | Hazel | G07F 7/1008 | 705/35 |
| 2009/0069040 A1* | 3/2009 | Wiesmuller | G06Q 20/12 | 455/466 |
| 2009/0313681 A1* | 12/2009 | Kim | H04L 63/18 | 726/4 |
| 2010/0088237 A1* | 4/2010 | Wankmueller | G06Q 30/0601 | 705/75 |
| 2010/0250442 A1* | 9/2010 | Coppinger | G06Q 20/4012 | 705/75 |
| 2012/0221852 A1* | 8/2012 | Ducharme | H04L 63/06 | 713/156 |
| 2013/0036058 A1* | 2/2013 | Kelly | G06Q 20/3823 | 705/67 |
| 2013/0227446 A1* | 8/2013 | Zala | G06F 8/38 | 715/762 |
| 2013/0282588 A1* | 10/2013 | Hruska | G06Q 20/40 | 705/67 |
| 2014/0040148 A1* | 2/2014 | Ozvat | G06Q 20/3829 | 705/71 |
| 2014/0310182 A1* | 10/2014 | Cummins | G06Q 20/3274 | 705/71 |
| 2015/0035643 A1* | 2/2015 | Kursun | H04W 12/065 | 340/5.52 |
| 2015/0254665 A1* | 9/2015 | Bondesen | G06Q 20/3672 | 705/44 |
| 2015/0371224 A1* | 12/2015 | Lingappa | G06Q 20/401 | 705/71 |
| 2016/0042485 A1* | 2/2016 | Kopel | G06Q 20/321 | 705/13 |
| 2016/0149705 A1* | 5/2016 | Bobinski | H04L 63/0838 | 713/155 |
| 2016/0164880 A1* | 6/2016 | Colesa | G06F 9/45558 | 726/1 |
| 2016/0210605 A1* | 7/2016 | Vaish | G06Q 20/12 | |
| 2016/0292688 A1* | 10/2016 | Barton | G06Q 20/10 | |
| 2017/0134045 A1* | 5/2017 | Huetter | H03M 5/145 | |
| 2017/0162004 A1* | 6/2017 | Hughes | G06Q 20/326 | |
| 2017/0272253 A1* | 9/2017 | Lavender | H04L 9/14 | |
| 2017/0308883 A1* | 10/2017 | Black | G06Q 20/206 | |
| 2018/0114226 A1* | 4/2018 | Desai | H04L 9/30 | |
| 2019/0236592 A1* | 8/2019 | Arora | G06Q 20/40 | |

* cited by examiner

SYSTEMS AND METHODS FOR AUTHENTICATION DEVICE-ASSISTED TRANSACTIONS

CROSS REFERENCE TO RELATED PATENT APPLICATIONS

This application is a continuation of U.S. application Ser. No. 14/967,168, filed Dec. 11, 2015, which is incorporated herein by reference in its entirety.

BACKGROUND

Many financial institution customers are able to complete various financial transactions through their computing devices. Customers may set up their computing devices to organize and selectively exchange payment information with transaction terminals in the absence of physical payment cards. Payment information may be managed by various software programs, including "mobile wallets" offered by financial institutions or other third party software developers. Such software programs may require additional authentication information before initiating a given transaction, such as unlocking the computing device, entering a personal identification number into the computing device, and so on.

SUMMARY

One embodiment relates to a financial institution computing system. The system includes a network circuit enabling the financial institution computing system to exchange information over a network. The system further includes a customer database storing financial information and identification code information for a plurality of customers. The system includes a transaction circuit. The transaction circuit is configured to receive, over the network via the network circuit, a transaction request specifying a financial account and including a first identification code provided by an authentication device in conjunction with a separate customer computing device. The transaction circuit is further configured to authenticate, using the first identification code and the customer database, the transaction request by determining whether the first identification code is associated with an authorized user of the financial account specified in the transaction request. The transaction circuit is configured to authorize, based at least in part on whether the transaction request is authenticated and information in the customer database, the transaction request. The transaction circuit is further configured to transmit a confirmation to a transaction terminal over the network via the network circuit.

Another embodiment relates to a method of authorizing transaction requests performed by a financial institution computing system. The method includes receiving, by a transaction circuit over a network via a network circuit, a transaction request specifying a financial account and including a first identification code provided by an authentication device in conjunction with a separate customer computing device. The method further includes authenticating, by the transaction circuit, using the first identification code and a customer database storing financial information and identification code information for a plurality of customers, the transaction request by determining whether the first identification code is associated with an authorized user of the financial account specified in the transaction request. The method includes authorizing, by the transaction circuit, based at least in part on whether the transaction request is authenticated and information in the customer database, the transaction request. The method further includes transmitting, by the transaction circuit via the network circuit, a confirmation to a transaction terminal over the network.

Yet another embodiment relates to non-transitory computer readable media having computer-executable instructions embodied therein that, when executed by a transaction circuit of a financial institution computing system, causes the financial institution computing system to perform operations to authorize transaction requests. The operations include receive, over a network via a network circuit, a transaction request specifying a financial account and including a first identification code provided by an authentication device in conjunction with a separate customer computing device. The operations further include authenticate, using the first identification code and a customer database storing financial information and identification code information for a plurality of customers, the transaction request by determining whether the first identification code is associated with an authorized user of the financial account specified in the transaction request. The operations include authorize, based at least in part on whether the transaction request is authenticated and information in the customer database, the transaction request. The operations further include transmit, via the network circuit, a confirmation to a transaction terminal over the network.

And yet another embodiment relates to an authentication device comprising a compact housing having at least one processor and memory. The authentication device is structured to maintain at least one identification code associated with an authorized user of at least one financial account maintained at a financial institution computing system. The authentication device is further structured to communicate with a separate customer computing device while each of the authentication device and the customer computing device are in possession of a user. The authentication device is structured to transmit at least one identification code to the customer computing device to be included with transaction information identifying one of the at least one financial account at the financial institution computing system, wherein the customer computing device receives the at least one identification code and transmits the transaction information and the at least one identification code to a transaction terminal for generating a transaction request, wherein the financial institution computing system authenticates the transaction request by determining whether the at least one identification code is associated with the authorized user.

DETAILED DESCRIPTION

Embodiments of systems and methods of authenticating payment transactions are discussed below. A customer computing device in conjunction with an authentication device that is physically distinct from the customer computing device and carried on the person of a customer prepares information to be provided to a financial institution as part of a transaction request. In various arrangements, the information includes payment credentials and other related payment card information to be included in a corresponding transaction request. The authentication device may operate in lieu of or in addition to one or more avenues of customer identification and authentication (e.g., a personal identification number (a "PIN"), a security question, etc.) during a transaction process. Further, in various arrangements, both the customer computing device and the authentication device belong to and are associated with an authorized user of a financial account. As such, a fraudster only in possession of payment credentials (e.g., a payment card account number) and/or the customer computing device itself without the authentication device would not be able to successfully complete corresponding transactions.

The embodiments discussed herein may be relevant to any of a variety of circumstances where an exchange of payment credentials may be useful. For example, in one arrangement, the authentication device may be used in the context of a purchase transaction at a brick and mortar retail establishment. In another arrangement, the authentication device may be used in the context of electronic payment transactions (e.g., person-to-person ("P2P") transactions, business-to-business ("B2B") transactions, person or business to/from government transactions, online shopping, etc.). Although discussed in the context of transactions below, the authentication device may also be used in various related or unrelated contexts where reliable user authentication is desirable, including electronic signatures, secure data delivery and/or receipt, and so on.

Figure 1:
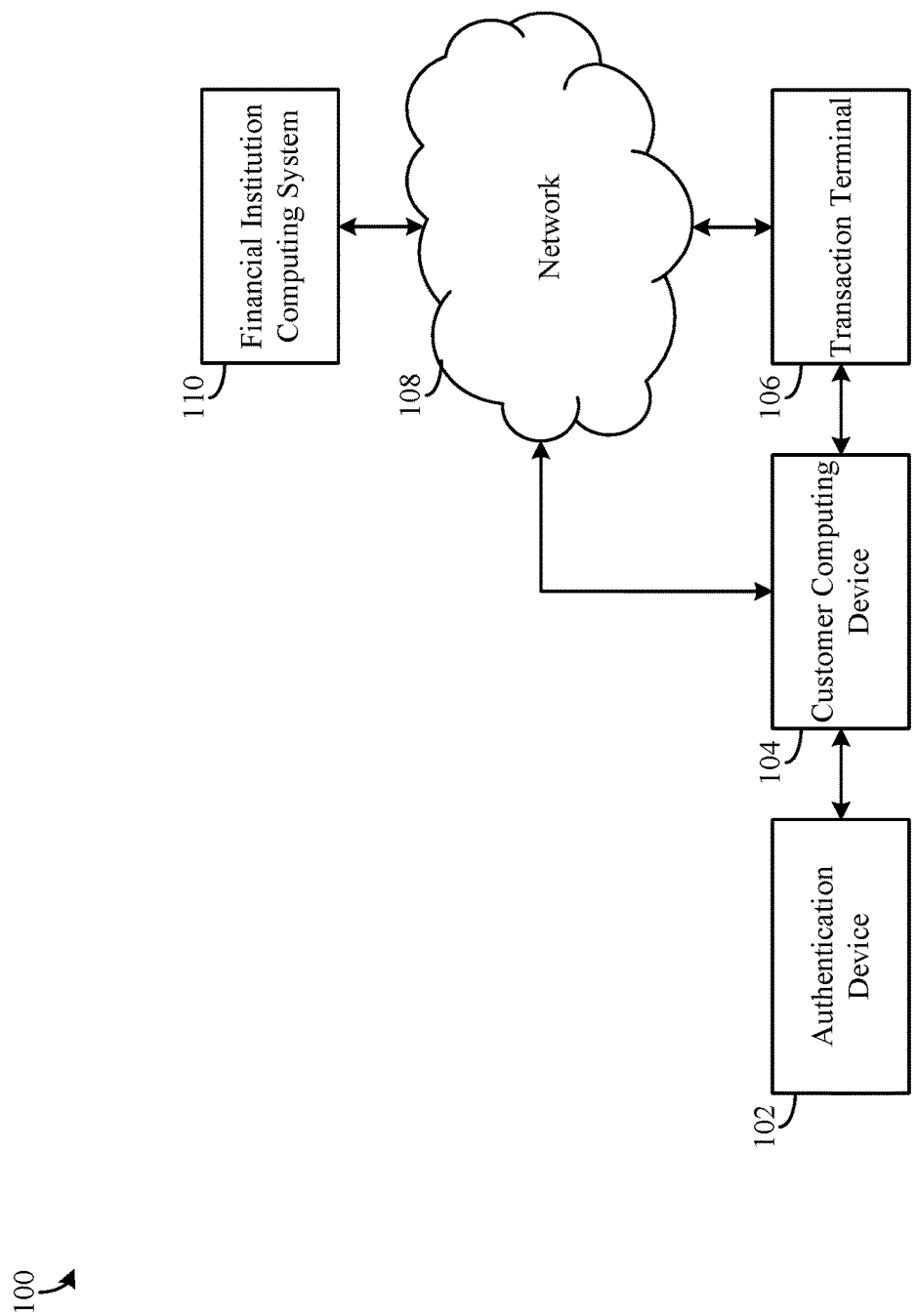
FIG. 1 is a block diagram illustrating a transaction request authorizing system, according to an example embodiment.

Referring to FIG. 1, a first transaction system 100 includes an authentication device 102, a customer computing device 104, a transaction terminal 106, and a financial institution computing system 110. Various components of the first system 100 may be configured to communicate with each other over a network 108. The network 108 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 108 includes the internet.

The authentication device 102 is a small circuitry system configured to communicate with the customer computing device 104 for various customer authentication procedures. The circuitry system may be integrated into a conveniently transportable housing, and may be implemented through existing functions in a multifunction device (e.g., a smartwatch) or may be configured as a proprietary authentication device (e.g., a dedicated bracelet, key fob, etc.). Example arrangements of the authentication device 102 include wearable computing devices (e.g., watches, bracelets, necklaces, etc.), devices that may otherwise be conveniently transported (e.g., a key fob or a badge in a pocket or handbag), and so on. The authentication device 102 may include a portable power source, for example a replaceable or rechargeable battery.

In some arrangements, the authentication device 102 is also configured to receive inputs from a customer. In one arrangement, the authentication device 102 is configured to measure biometric data from the body of a customer. The biometric data may include, for example, presence and/or rate of a heartbeat, body temperature, bodily movement, etc. In some such arrangements, the authentication device 102 includes a storage medium sufficient to maintain stored biometric data corresponding to an authorized user (e.g., a normal resting heart rate). As such, the authentication device 102 may be able to determine whether measured biometric data indicates that the authentication device 102 is in the possession of a person, and further, whether the person is an authorized user (e.g., by comparing and matching measured data to stored data, for example within specified tolerances). In some such arrangements, the authentication device 102 may be configured to deny communications with the customer computing device 104 unless customer inputs indicate that the authentication device 102 is in the possession of an authorized user.

The authentication device 102 is configured to communicate its presence to the customer computing device 104 over relatively short distances (e.g., within a few inches, within a few inches to a couple feet, or within a few yards). In some arrangements, the authentication device 102 communicates with the customer computing device 104 wirelessly (e.g., via Bluetooth™, RFID, NFC, etc.).

In some arrangements, the authentication device 102 provides the customer computing device 104 with some form of data sufficient to generate an identification code included in transaction information to be sent to the financial institution computing system 110. In various arrangements, transaction information includes financial and non-financial information that may be provided by a customer to identify a financial account (e.g., a token, a primary account number ("PAN"), etc.) and authenticate a transaction (e.g., identification codes, encrypted and/or hashed data to be processed during authentication procedures, etc.) with respect to the financial account. For example, in one arrangement, the authentication device 102 is configured to transmit a static code that is unique to the authentication device 102. The static code may be included in transaction information prepared in the customer computing device 104, and the transaction information may be transmitted to the financial institution computing system 110 as part of a transaction request for authentication and payment authorization (e.g., via the transaction terminal 106 or over the network 108).

In another arrangement, the authentication device 102 provides the customer computing device 104 with a dynamic code that is periodically updated or changed at some interval (e.g., at every unit of time, after a predetermined number of communications with the customer computing device 104, etc.). In one such an arrangement, the dynamic code is generated at an interval that is also tracked at the financial institution computing system 110. In other words, in some arrangements, the financial institution computing system 110 may be synchronized with the manner in which the dynamic code is updated or changed (e.g., both the authentication device 102 and the financial institution computing system 110 updates the dynamic code every five minutes, or uses an encrypted timestamp as the dynamic code). As such, the financial institution computing system 110 may be able to recognize a dynamic code included in transaction information along with the association of the dynamic code with the authentication device 102.

The customer computing device 104 is a computing system associated with an authorized user of one or more financial accounts at the financial institution. Authorized users may include individuals, business entities, government entities, and agents. The customer computing device 104 includes one or more processors and non-transitory storage mediums housing one or more logics configured to allow the customer computing device 104 to exchange data over the network 108, execute software applications, access websites, generate graphical user interfaces, and perform other similar operations. Examples of the customer computing device 104 include smartphones, tablets, wearable computing devices such as smartwatches, laptop computers, desktop computers, virtual desktops, and so on. Although both may be computing devices, the customer computing device 104 is separate and physically distinct from the authentication device 102 (e.g., each of the authentication device 102 and the customer computing device 104 include distinct respective housings, and may be carried by a user independently of each other). As such, for example, the authentication device 102 and the customer computing device 104 may each be a smartwatch in different arrangements (e.g., where the customer computing device 104 is a smartphone and the authentication device 102 is a smartwatch, or where the customer computing device 104 is a smartwatch and the authentication device 102 is a key fob).

The customer computing device 104 is configured to cooperate with the authentication device 102 to prepare and transmit transaction information that is ultimately received at the financial institution computing system 106. In some arrangements, the customer computing device 104 may be configured to authenticate the authentication device 102 (e.g., via public key infrastructures ("PKIs"), certificates, etc.) prior to preparing transaction information. In turn, in some arrangements, the authentication device 102 may be configured to authenticate the customer computing device 104 before or as part of transmitting an identification code to the customer computing device 104. As such, in some arrangements, the customer computing device 104 and the authentication device 102 may each be configured to authenticate the other before exchanging identification code information.

In operation, in one arrangement, the first system 100 is configured to authenticate transaction information with symmetrical encryption keys at the authentication device 102 and the financial institution computing system 110. For example, a shared secret key may be used in conjunction with an encryption algorithm to encrypt and decrypt subject data. The shared secret keys may be provided to users or devices that are authorized to view and/or use subject data (e.g., the authentication device, the financial institution computing system 110, etc.). As such, only those entities in possession of the shared secret key may decrypt subject data that was encrypted with the shared secret key.

In one such arrangement, a first shared secret key specific to a customer of the financial institution and a customer identification ("ID") code (e.g., a customer-specific code or a generic approval code shared among several customers) may be maintained at the financial institution computing system 110. The authentication device 102 may be securely manufactured to include the first shared secret key and the customer ID code as well, and may be securely delivered to the customer (e.g., in a manner similar to a credit card). The authentication device 102 may be structured to encrypt the customer ID code using an encryption algorithm in conjunction with the first shared secret key, and communicate the encrypted customer ID code to the customer computing device 104 on demand. Upon receiving the authentication device 102, the customer may use the customer computing device 104 along with the authentication device 102 to prepare transaction information to be provided to the financial institution computing system 110. The financial institution computing system 110 may receive the transaction information, decrypt the encrypted customer ID code using the stored first shared secret key associated with the customer, and reveal the customer ID code. The financial institution computing system 110 may compare the revealed customer ID code with a stored customer ID code known to be associated with the customer, and authenticate the transaction information.

In some arrangements, another set of shared secret keys may be maintained at each of the authentication device 102 and the customer computing device 104, allowing each device to authenticate the other. For example, a second shared secret key and a local device code (e.g., a code specific to the authentication device 102, or a code specific to the customer computing device 104) may be stored at each of the authentication device 102 and the customer computing device 104. Before the customer computing device 104 transmits transaction information to the financial institution computing system 110, the authentication device 102 may request an encrypted copy of the local device code from the customer computing device 104. The customer computing device 104 may encrypt the local device code using an encryption algorithm along with the second shared secret key, and transmit the encrypted local device code to the authentication device 102. The authentication device 102 may then use a stored copy of the second shared secret key to decrypt and reveal the local device code. The authentication device 102 may then compare the decrypted local device code with a stored copy of the local device code to authenticate the customer computing device 104. The authentication device 102 may subsequently transmit an encrypted copy of the customer ID (i.e., using the first shared secret key) to the customer computing device 104, which may prompt the customer computing device 104 to include the encrypted copy of the customer ID in transaction information for the financial institution computing system 110. The transaction information may then be authenticated at the financial institution computing system 110 as discussed above.

In other arrangements, the first system 100 is configured to authenticate transaction information through the use of asymmetrical keys at the authentication device 102 and the financial institution computing system 110. For example, in public key and private key encryption systems, a public key is complementary to a corresponding private key. As such, the public key can decrypt messages encrypted by the private key, and the private key can decrypt messages encrypted by the public key. However, the public key cannot be used to decrypt messages that were also encrypted by the public key (i.e., as previously encrypted by that same copy of the public key, or by another copy of the public key), and the private key cannot be used to decrypt messages that were also encrypted by the private key. The public key may be distributed to one or several different entities, and across secure networks or unsecured networks, however the private key may be maintained in a more secure or private manner (e.g., by a single user or device, or by a handful of users or devices and distributed in a particularly secure fashion).

In one such arrangement, a first private key and the customer ID code may be stored at the authentication device 102 and a corresponding first public key and the customer ID code may be stored at the financial institution computing system 110. As such, as the customer prepares transaction information, the authentication device 102 may encrypt the customer ID code using the first private key, and transmit the encrypted customer ID code to the customer computing device 104. The customer computing device 104 may include the encrypted customer ID code in the transaction information to be transmitted to the financial institution computing system 110 as part of a transaction request. The financial institution computing system 110 may receive the transaction request, and use the first public key to decrypt and reveal the customer ID code to authenticate the transaction request.

In another such arrangement, in addition to the first private key at the authentication device 102 and the first public key at the financial institution computing system 110, a second private key is stored at the financial institution computing system 110 and a second public key along with a customer computing device ID code (e.g., a code specific to authorized customer computing devices) is stored at the customer computing device 104 (e.g., provided by the financial institution computing system 110 over the network 108). In such an arrangement, the customer computing device 104 may receive an encrypted customer ID code from the authentication device 102 (i.e., as encrypted using the first private key) to prepare transaction information. The customer computing device 104 may in turn encrypt the customer computing device ID code using the second public key. The customer computing device 104 may include both the encrypted customer ID code and the encrypted customer computing device ID code in the transaction information sent to the financial institution computing system 110 as part of a transaction request. Upon receiving the transaction request, the financial institution computing system 110 may use the first public key to decrypt and reveal the customer ID code and use the second private key to decrypt and reveal the customer computing device ID code. Upon verifying that each decrypted ID code matches up with stored copies of each ID code, financial institution computing system 110 may be relatively assured that the customer ID was specifically provided from the authentication device 102 (i.e., as the customer ID was encrypted via the first private key, exclusive to the authentication device 102), and that the customer computing device ID was provided from a device associated with the customer (i.e., as the customer computing device ID was encrypted by the second public key, distributed among authorized customer devices).

In yet another arrangement, in addition to the first private key at the authentication device 102 and the first public key at the financial institution computing system 110, a second private key as well as a local device code is stored at the authentication device 102 and a second public key as well as the local device code is stored at the customer computing device 104 (e.g., provided by the financial institution computing system 110 over the network 108 to devices associated with the customer). This arrangement allows the authentication device 102 and the customer computing device 104 to cross-authenticate each other. For example, the authentication device 102 may request the local device code from the customer computing device 104. In response, the customer computing device 104 may encrypt the local device code using the second public key, and transmit the encrypted local device code to the authentication device 102. The authentication device 102 may decrypt and reveal the local device code using the second private key, and confirm that the provided local device code matches the stored local device code to authenticate the customer computing device 104. The authentication device 102 may then encrypt the customer ID code using the first private key and transmit the encrypted customer ID to the customer computing device 104. The customer computing device 104 may then include the encrypted customer ID in the transaction information to be sent as part of a transaction request to the financial institution computing system 110. The financial institution computing system 110 may decrypt and reveal the customer ID using the first public key, and authenticate the transaction request.

As one of skill in the art would recognize, other encryption arrangements may be used in the first system 100. For example, any of several data hashing algorithms may also be applied at any of the authentication device 102, the customer computing device 104, and the financial institution computing system 110 (e.g., to compare hashed data for authentication instead of actual ID codes). In addition, the data encrypted by any of the secret, private, and/or public keys may be static (e.g., a customer ID code for a customer) or dynamic (e.g., a timestamp, where time is tracked at each of the authentication device 102 and the financial institution computing system 110). In some arrangements, public keys may also be maintained at the transaction terminal 106, such that the transaction terminal 106 may authenticate transaction information received from the customer computing device 104 (e.g., to confirm that the authentication device 102 was present while the transaction information was prepared) prior to transmitting a corresponding transaction request to the financial institution computing system 110. In some arrangements, a public key may be associated with multiple devices of an authorized user. In some such arrangements, a corresponding private key may be stored at the authentication device 102, and as such, the same authentication device 102 may be used to generate transaction requests at each of the multiple devices of the authorized user. In some arrangements, a corresponding private key may be stored at the financial institution computing system 110, and as such, the financial institution computing system 110 may be able to recognize transaction requests generated by any of the multiple devices of the authorized user.

In some arrangements, the customer computing device 104 is configured to manage at least one payment credential corresponding to a method of payment associated with a customer. For example, the customer computing device 104 may include one or more circuits configured to provide the customer with a mobile wallet functionality, as discussed in more detail with respect to FIG. 2, below. In preparing transaction information, the customer computing device 104 may include payment credentials corresponding to a method of payment and an identification code (e.g., the customer ID code). The customer computing device 104 may then transmit the transaction information to the transaction terminal 106.

The transaction terminal 106 is a computing system associated with an individual or entity with whom a customer seeks to transact (e.g., merchants, service providers, etc.). The transaction terminal 106 is configured to receive transaction information from the customer computing device 104 and create a transaction request. The transaction request is a request for the financial institution computing system 110 to withdraw a designated sum of funds from a financial account corresponding to the transaction information and deposit the designated sum of funds into an identified recipient account (e.g., the individual or entity associated with the transaction terminal 106). Examples of the transaction terminal 106 include, merchant point of sale terminals, a mobile device serving as a mobile point of sale, ATMs, one or more servers configured to process online, P2P, B2B, P2B, or government transactions, and so on.

The financial institution computing system 110 is a computing system at a financial institution that is capable of maintaining customer accounts (e.g., payment card accounts) and databases of customer information. In the context of the present disclosure, the financial institution can include commercial or private banks, credit unions, investment brokerages, and so on. In response to a received transaction request, the financial institution computing system 110 may be configured to authenticate the transaction information, and authorize the transaction request (e.g., determining whether the identified financial account contains sufficient funds, and transferring the designated sum of funds to an identified account). The financial institution computing system 110 may be configured to transmit a message back to the transaction terminal 106 indicating whether the transaction request was granted or denied.

In operation according to one arrangement, a customer is in possession of both the authentication device 102 (e.g., a key fob) and the customer computing device 104 (e.g., a smartphone). The customer may walk into a brick and mortar retail establishment, identify an item for purchase, and approach the transaction terminal 106. The customer allows the customer computing device 104 to communicate with the transaction terminal 106 (e.g., by bringing the customer computing device 104 within range of an NFC reader at the transaction terminal 106). At a point prior to or concurrently with the communication between the customer computing device 104 and the transaction terminal 106, the customer computing device 104 may receive an identification code from the authentication device 102 (e.g., a dynamic code). The customer computing device 104 then includes the identification code in transaction information corresponding to a customer approved method of payment (e.g., a credit card), and transmits the transaction information to the transaction terminal 106. The transaction terminal 106 generates a transaction request that includes the transaction information (i.e., including the identification code), and transmits the transaction request to the financial institution computing system 110 over the network 108. The financial institution computing system 110 receives and authenticates the transaction request using the included identification code, performs any of a variety of other financial and/or fraud checks (e.g., available balances, transaction histories, personal identification number ("PIN") verification, etc.), and authorizes the requested transaction. The financial institution computing system 110 then transmits a confirmation back to the transaction terminal 106 over the network 108. Additional details and functions of the first system 100 are discussed below.

Figure 2A:
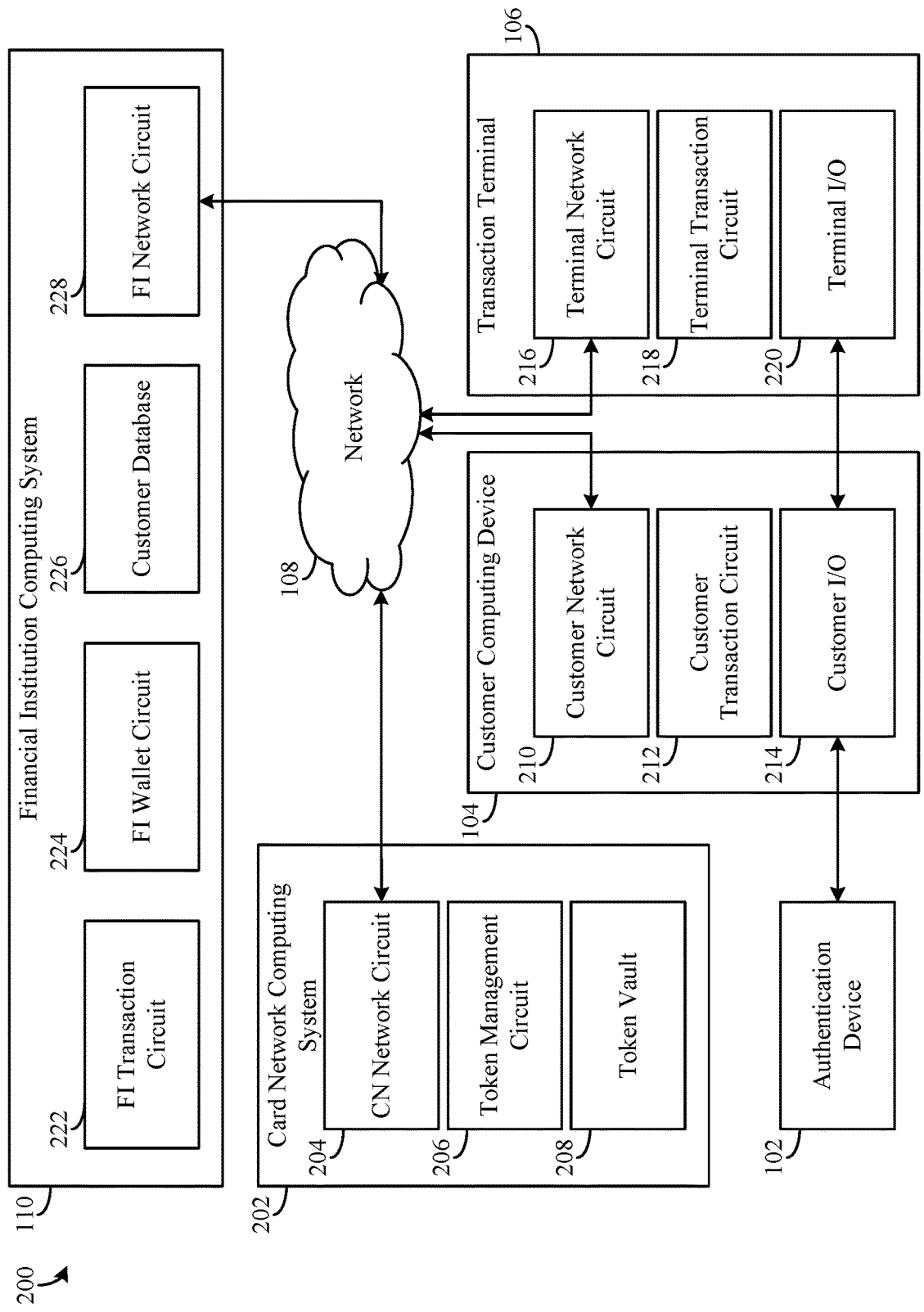
FIGS. 2A and 2B are block diagrams illustrating example arrangements of the system shown in FIG. 1.

Referring now to FIG. 2A, a second transaction system 200 is shown as a more detailed embodiment of the first system 100. The second system 200 includes example arrangements of the authentication device 102, the customer computing device 104, the transaction terminal 106, the network 108, and the financial institution computing system 110 of FIG. 1.

The second system 200 further includes a card network computing system 202. The card network computing system 202 is a computing system associated with a card network. Examples of card networks include Visa®, MasterCard®, etc. The card network computing system 202 performs operations associated with the generation and issuance of payment card tokens. Payment card tokens are surrogate values that replace the primary account number ("PAN") associated with a payment card, such as a credit card, debit card, ATM card, stored value card, etc. Payment card tokens can pass basic validation rules of an account number. Hence, in the case of a debit card, the payment card token for a given debit card "looks like" a real debit card number (e.g., a sixteen-digit number), but in fact is only a token. As part of a token generation process, steps are taken such that the generated payment card token does not have the same value as or otherwise conflicts with a real PAN (e.g., a real debit card number). A given payment card token may be provisioned to various locations for use in various types of scenarios, including ATMs for performing various financial operations, storage at a customer computing device (e.g., a smartphone) for in-person or on-line transactions with a merchant, and so on.

The card network computing system 202 includes a card network ("CN") computing system network circuit 204, a token management circuit 206, and a token vault 208. As used herein, the term "circuit" may include hardware structured to execute the functions as described. In some embodiments, each respective "circuit" may include software for configuring the hardware to execute the functions described herein. The circuit may be embodied as one or more circuitry components including, but not limited to, processing circuitry, storage media, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuit, hybrid circuit, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

A given "circuit" may also include one or more processors communicatively coupled to a memory. In this regard, the one or more processors may execute instructions stored in memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus.

Each memory device discussed herein may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Each respective memory may be operable to maintain or otherwise store information relating to the operations performed by one or more associated circuits, including processor instructions and related data (e.g., database components, object code components, script components, etc.), in accordance with the example embodiments described herein.

Based on the operations described herein with respect to each circuit, a given circuit may further be communicatively coupled to one or more other components, for example other circuits, input devices (e.g., devices providing incoming data to be processed by the circuit), output devices (e.g., devices receiving and acting upon data processed by the circuit), or intermediary devices (e.g., routing data to or from other components). In addition, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

The CN network circuit 204 enables the card network computing system 202 to exchange data over the network 108. As such, the CN network circuit 204 allows the card network computing system 202 to exchange data to remote computing devices (e.g., the customer computing device 104, the transaction terminal 106, the financial institution computing system 110, etc.).

The token vault 208 is a storage medium maintaining established payment card tokens-to-PAN mapping data. The token vault 208 may include non-transient data storage mediums (e.g., local disc or flash-based hard drives, local network servers, and the like) or remote data storage facilities (e.g., cloud servers).

The token management circuit 206 is configured to provision and manage tokens. In one aspect, the token management circuit 206 can generate a new unique code to be provisioned as a token, associate the token with a PAN, and store corresponding mapping data in the token vault 208. In another aspect, the token management circuit 206 may be able to replace tokens as well as activate and deactivate tokens, and update the token vault 208 accordingly. The token management circuit 206 may also be configured to associate permissions with each token, thereby allowing or disallowing the transmission or use of data associated with a given token. The token management circuit 206 may also cause one or more tokens to be disposed on the customer computing device 104, for example, as discussed with respect to the customer transaction circuit 212 below.

In the second system 200, the customer computing device 104 includes a customer network circuit 210 enabling the customer computing device 104 to exchange data over the network 108, customer transaction circuit 212, and a customer input/output device ("I/O") 214. The customer I/O 214 includes hardware and associated logics configured to enable the customer computing device 104 to exchange information with a customer, the authentication device 102, and the transaction terminal 106 (e.g., via a corresponding terminal I/O 220, as discussed below). An input aspect of the customer I/O 214 allows the customer to provide information to the customer computing device 104, and can include, for example, a mechanical keyboard, a touchscreen, a microphone, a camera, a fingerprint scanner, any user input device engageable to the customer computing device 104 via a USB, serial cable, Ethernet cable, and so on. In turn, an output aspect of the customer I/O 214 allows the customer to receive information from the customer computing device 104, and can include, for example, a digital display, a speaker, illuminating icons, LEDs, and so on. Further, the customer I/O 214 may be configured to include assemblies that serve both input and output functions, allowing the authentication device 102 and the transaction terminal 106 to exchange information with the customer computing device 104. Such assemblies include, for example, radio frequency transceivers (e.g., RF or NFC-based transceivers) and other short range wireless transceivers (e.g., Bluetooth™, laser-based data transmitters, etc.).

The customer transaction circuit 212 is a circuit configured to assemble transaction information, and in some arrangements, is also configured to assemble transaction requests. In some arrangements where the customer computing device 104 is embodied as a mobile device, the customer transaction circuit 212 may be configured to provide a user with a mobile wallet functionality. A provider (e.g., a software developer or publisher, or the financial entity itself) can make a software application available to be placed on the customer computing device 104. A software developer may make the software application available to be downloaded (e.g., via the developer's website, via a digital marketplace, an app store, or in another manner). Responsive to a user selection of an appropriate link, the software application can be transmitted to the customer computing device 104 and cause itself to be installed on the customer computing device 104. Installation of the software application creates the customer transaction circuit 212 on the customer computing device 104. Specifically, after installation, the thus-modified customer computing device 104 includes the customer transaction circuit 212 (e.g., embodied as a processor and instructions stored in non-transitory memory that are executed by the processor, along with other hardware and associated logics depending on operations performed by a given circuit). Other circuits discussed herein may be implemented in a similar fashion, or in other ways (e.g., via a portal to a remote computing system configured to perform functions described herein, via one or more software plugins, etc.). The customer transaction circuit 212 may provide an interface that is configured to receive and display mobile web pages (e.g., web pages provided on the customer I/O 214 prompting the user to provide information to create an account, web pages displaying account balance information and past transactions, and so on) received from a mobile wallet bank computer system (e.g., an FI wallet circuit 224 at the financial institution computing system 110 as discussed below, or a third party wallet provider) over the network 108 via the customer network circuit 210.

While setting up a mobile wallet account, the customer transaction circuit 212 may receive, organize, and store payment credentials (e.g., payment tokens) from a payment card (e.g., from local storage disposed on a credit card, debit card, gift card, etc., for example via functionalities available through EMV smart cards such as Visa payWave™, Mastercard PayPass™, and American Express ExpressPay™) or the card network computing system 202 over the network 108. The customer transaction circuit 212 may then allow users to choose any one of the accounts for transferring funds, for example to a merchant for goods or services. A user may also select a default account that the customer transaction circuit 212 will use to make payments. The customer may alternatively use account selection logic at the customer transaction circuit 212 to select a specific account to use for each transaction.

In some arrangements, the customer transaction circuit 212 is configured to cooperate with the customer I/O 214 to prepare transaction information. For example, prior to a transaction, the customer transaction circuit 212 may be configured to authenticate the authentication device 102, and also allow the authentication device 102 to authenticate the customer computing device 104 (e.g., as discussed with respect to FIG. 1). The customer transaction circuit 212 may then retrieve an identification code from the authentication device 102 via the customer I/O 214, and prepare transaction information to include a customer payment token and the identification code. The customer transaction circuit 212 may subsequently transmit the transaction information to the transaction terminal 106 via the customer I/O 214.

The transaction terminal 106 includes a terminal network circuit 216 enabling the transaction terminal 106 to exchange data over the network 108, a terminal transaction circuit 218, and a terminal I/O 220. Similar to the customer I/O 214, the terminal I/O 220 includes hardware and associated logics configured to enable the transaction terminal 106 to exchange information with a customer, the customer computing device 104 (e.g., via corresponding hardware and logics at the customer I/O 214), and a terminal attendant (e.g., a store clerk), if any. The terminal I/O 220 may include any of the input, output, and input/output functionalities discussed with respect to the customer I/O 214, above.

The terminal transaction circuit 218 is configured to receive transaction information (e.g., including a payment token and an identification code) from the customer computing device 104 via the terminal I/O 220, and assemble corresponding transaction requests. The terminal transaction circuit 218 determines a total transaction amount for a payment transaction (e.g., total price of specified products and/or services, plus sales tax, other fees, etc.), bundles the total with the transaction information to make a transaction request, and transmits the transaction request to the financial institution computing system 110 over the network 108 via the terminal network circuit 216.

The financial institution computing system 110 includes a financial institution ("FI") transaction circuit 222, an FI wallet circuit 224, a customer database 226, and an FI network circuit 228 enabling the financial institution computing system 110 to exchange data over the network 108.

The customer database 226 allows the financial institution computing system 110 to retrievably store customer information relating to the various operations discussed herein, and may include non-transient data storage mediums (e.g., local disc or flash-based hard drives, local network servers, and the like) or remote data storage facilities (e.g., cloud servers). The customer database 226 includes personal customer information (e.g., names, addresses, phone numbers, and so on), identification information (e.g., driver's license numbers, standard biometric data, and so on), and customer financial information (e.g., token information, account numbers, account balances, available credit, credit history, transaction histories, and so on). The customer database 226 includes information relating to a plurality of users who are authorized to make transactions from a plurality of financial accounts (e.g., credit card accounts, checking accounts, etc.). Authorized users may include account owners, or other individuals and entities designated as authorized users by a respective account owner. The customer database 226 further includes identification code information (e.g., identification codes, encryption keys, identification code generation algorithms, identification code generation intervals, etc.) corresponding to the plurality of financial accounts and the plurality of authorized users. In some arrangements, the customer database 226 is also configured as a token vault (e.g., similar to the token vault 208 at the card network computing system 202) that is maintained at the financial institution computing system 110.

In some arrangements, the FI wallet circuit 224 enables or otherwise supplements the operation of a mobile wallet functionality of the customer transaction circuit 212. In some arrangements, the FI wallet circuit 224 is configured to communicate with the customer transaction circuit 212 over the network 108 (e.g., via respective network circuits 228, 210). A customer may establish the customer transaction circuit 212 on the customer computing device 104 and set up a mobile wallet account. In one arrangement, the customer may then manually provide a PAN to the customer transaction circuit 212 via the customer I/O 214, and the customer transaction circuit 212 may transmit the PAN to the FI wallet circuit 224 over the network 108 (e.g., via respective network circuits 210, 228). The FI wallet circuit 224 may then route the PAN to the token management circuit 206 over the network 108 for tokenization, receive a payment token in return, and transmit the payment token back to the customer transaction circuit 212. In another arrangement, the FI wallet circuit 224 automatically tokenizes PAN information associated with the customer in the customer database 226. In such an arrangement, after the customer sets up the mobile wallet account, the FI wallet circuit 224 may provide tokens corresponding to one or more financial accounts of the customer to the customer transaction circuit 212. The customer transaction circuit 212 may then include the payment token in transaction information that is sent as part of transaction requests to the financial institution computing system 110. The FI wallet circuit 224 may also cooperate with the customer transaction circuit 212 and the token management circuit 206 to manage token permissions, token life cycles, etc.

The FI transaction circuit 222 is configured to facilitate transactions involving the authentication device 102. The FI transaction circuit 222 may receive a transaction request from the transaction terminal 106 over the network 108 via the FI network circuit 228. In some arrangements, the FI transaction circuit 222 receives the transaction request from the card network computing system 202 (e.g., where payment tokens are used). In one aspect, the FI transaction circuit 222 may authenticate the authentication device 102 using the identification code included in the transaction request (e.g., decrypting a customer ID using a public key, a private key, or a shared secret key, and comparing the customer ID with a customer ID stored in the customer database 226). In one arrangement, the FI transaction circuit 222 may look up the identification code in the customer database 226 and confirm that the authentication device 102 is properly being used with the customer computing device 104 in possession of an authorized user of the financial account specified in the transaction request. In various arrangements, the FI transaction circuit 222 looks up a known static identification code or a known dynamic identification code (e.g., via a known algorithm and update interval) in the customer database 226. If a known identification code matches up with the identification code in the transaction request, the FI transaction circuit 222 may authenticate the transaction request. In some arrangements, if an identification code is not included in the transaction request (e.g., where the transaction information was prepared in the absence of the authentication device 102), the FI transaction circuit 222 may be configured to automatically deny the transaction request. In other arrangements where an identification code is not included in the transaction request, the FI transaction circuit 222 may be configured to request additional authentication information from the customer (e.g., a PIN, answers to one or more security questions, etc.).

In some arrangements, transaction information in the transaction request includes biometric data measured by the authentication device 102. In some such arrangements, the FI transaction circuit 222 may authorize the transaction request at least in part by comparing the measured biometric data with stored biometric data associated with an authorized user in the customer database 226. The FI transaction circuit 222 may authorize the transaction request if the measured biometric data is determined to match (e.g., within a specified degree of tolerance of deviation) the stored biometric data.

In another aspect, the FI transaction circuit 222 may perform a series of checks that do not involve the authentication device 102 before authorizing the transaction request. The FI transaction circuit 222 may perform one or more fraud checks. In addition, the FI transaction circuit 222 may determine whether the transaction request may properly be completed, for example determining whether the financial account specified in the transaction request contains sufficient funds to cover the purchase price. In one arrangement, if the transaction request passes a plurality of fraud checks and the underlying transaction may properly be completed, the FI transaction circuit 222 authorizes and completes the transaction request.

In operation according to one embodiment, a customer sets up the customer transaction circuit 212 on the customer computing device 104 and, and uses the customer transaction circuit 212 in cooperation with the FI wallet circuit 224 to register the authentication device 102 and at least one approved method of payment at the financial institution computing system 110. The customer may approach the transaction terminal 106 to purchase a good or service, and tap the customer computing device 104 against the terminal I/O 220. The customer transaction circuit 212 and the authentication device 102 may mutually authenticate each other, and then prepare transaction information including an identification code and a payment token. The transaction information may then be transmitted from the customer I/O 214 to the terminal I/O 220.

The terminal transaction circuit 218 receives and bundles the transaction information with a transaction amount to generate a transaction request. The terminal transaction circuit 218 then transmits the transaction request to the card network computing system 202 over the network 108 via the terminal network circuit 216. The token management circuit 206 receives the transaction request and cooperates with the token vault 208 to detokenize the payment token into a PAN. The token management circuit 206 then includes detokenized payment token information in the transaction request, and transmits the transaction request to the financial institution computing system 110 over the network 108 via the CN network circuit 204.

The FI transaction circuit 222 at the financial institution computing system 110 receives the transaction request via the FI network circuit 228. The FI transaction circuit 222 cooperates with the customer database 226 to authenticate the transaction request using the included identification code, performs a plurality of fraud checks, and determines whether the requested transaction may properly be completed. The FI transaction circuit 222 authorizes the requested transaction, and transmits a confirmation to be received at the terminal transaction circuit 218 over the network 108 (e.g., via the card network computing system 202). The terminal transaction circuit 218 may cause the terminal I/O 220 to provide the customer or a clerk with a visual representation of the confirmation (e.g., a screen on a display, a printed receipt, etc.).

Figure 2B:
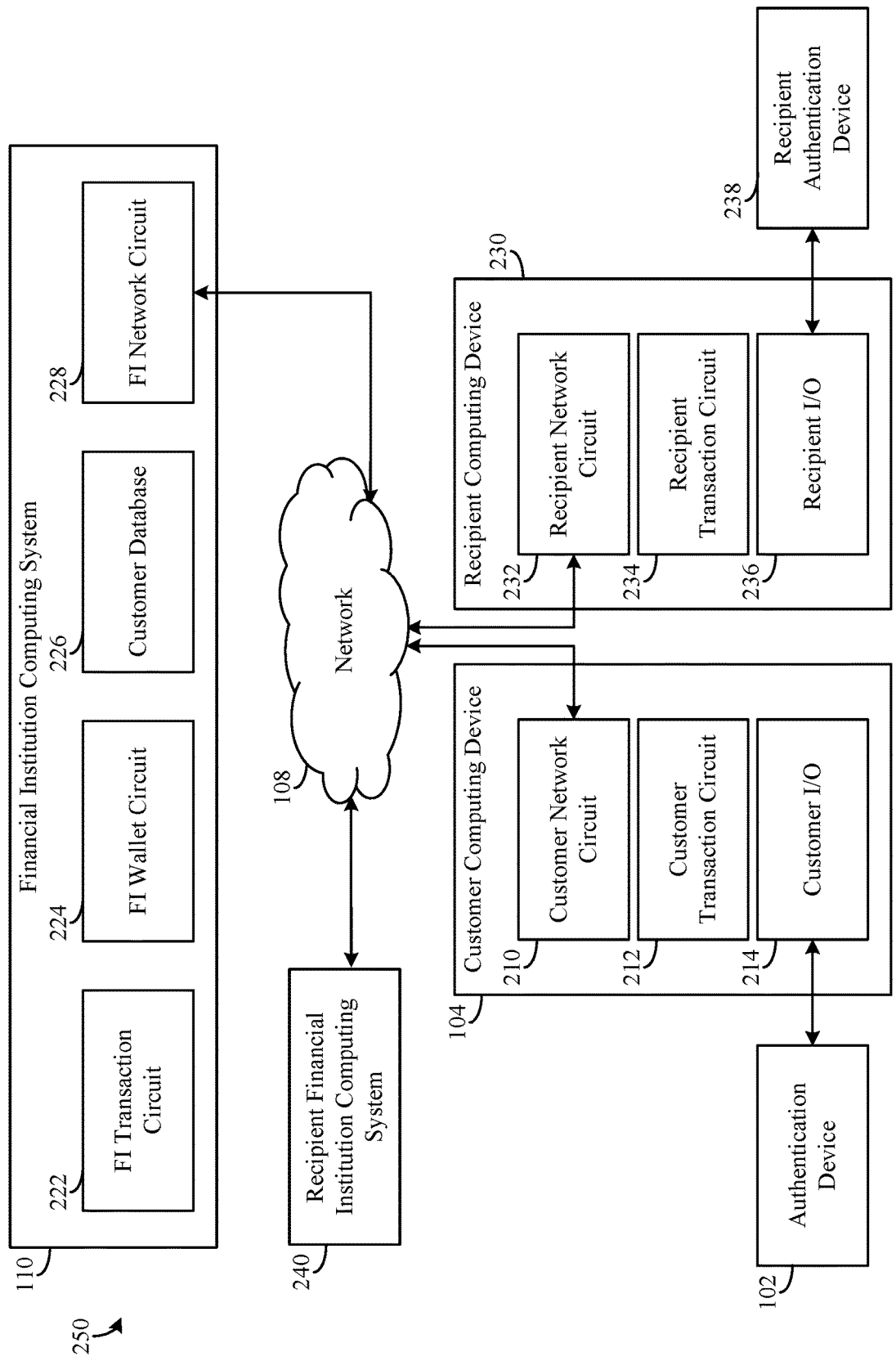

Referring now to FIG. 2B, a third transaction system 250 is another more detailed arrangement of the first transaction system 100. In the third transaction system 250, a customer may use the customer computing device 104 to "push" transaction requests to the financial institution computing system 110. In contrast, in the second transaction system 200, transaction information is "pulled" from the customer computing device 104 by the transaction terminal 106. The third transaction system 250 includes the authentication device 102, the customer computing device 104, the network 108, and the financial institution computing system 110 along with their respective components as discussed with respect to the second system 200. However, the third system 250 further includes a recipient financial institution computing system 240, and the transaction terminal 106 is shown as a recipient computing device 230 and a recipient authentication device 238.

The recipient computing device 230 is a computing system associated with a recipient of a transaction request created on behalf of the customer associated with the customer computing device 104. In various arrangements, the recipient computing device 230 is a computing device similar to the customer computing device 104, and includes a corresponding recipient network circuit 232, a recipient transaction circuit 234, and a recipient I/O 236 (e.g., similar to the customer network circuit 210, the customer transaction circuit 212, and the customer I/O 214, respectively). The recipient authentication device 238 is also associated with the recipient, and operates in conjunction with the recipient transaction circuit 234 to authenticate various electronic communications (e.g., similar to the authentication device 102 and the customer transaction circuit 212). The recipient financial institution computing system 240 is a computing system at a financial institution associated with the recipient (e.g., similar to the financial institution computing system 110).

In the third system 250, the customer transaction circuit 212 is further configured to assemble transaction information, generate transaction requests, and transmit transaction requests to the financial institution computing system 110. The transaction requests may, for example, be made in the context of person-to-person ("P2P") transactions (e.g., via the clearXchange™ network) where customers of a first financial institution (e.g., having accounts the financial institution computing system 110) may transfer funds to accounts of recipients at the first financial institution or at a second financial institution (e.g., having accounts the recipient financial institution computing system 240). In some arrangements, the FI transaction circuit 222 is further configured to enable P2P transactions. For example, the FI transaction circuit 222 may allow customers and recipients to register for a P2P transaction service (e.g., by collecting usernames and passwords, identification codes, account information, and so on, and storing such information in the customer database 226). In some arrangements, a customer P2P account and a recipient P2P account may be securely made and used with respective authentication devices. For example, each of a customer and a recipient may register respective P2P accounts using identification codes provided by respective authentication devices 102, 238. The customer and the recipient may then log in (e.g., providing usernames and identification codes) and use P2P accounts to transfer funds. The FI transaction circuit 222 may subsequently receive a P2P transaction request, debit an account of a corresponding customer, and credit an account of an identified recipient. As such the third system 250 may be configured to require users to be properly in possession of an authentication device 102, 238 in order to set up and use the P2P transactions service.

In operation, a customer may use the customer computing device 104 in conjunction with the authentication device 102 to assemble financial information including an identification code and generate a P2P transaction request to a recipient. The customer transaction circuit 212 generates the P2P transaction request and transmits the P2P transaction request to the financial institution computing system 110 over the network 108 via the customer network circuit 210. The FI transaction circuit 222 receives and authenticates the P2P transaction request (e.g., using at least the identification code as discussed with respect to FIG. 2A), and determines that the recipient maintains an account at the recipient financial institution computing system 240. The FI transaction circuit 222 may then debit a customer account and transfer funds to a recipient account according to the P2P transaction request to the recipient financial institution computing system 240. The recipient may then use the recipient computing device 230 in conjunction with the recipient authentication device 238 to access and view information relating to the P2P transaction request.

In other arrangements, transaction requests may be made in the context of entity-to-entity transactions (e.g., business-to-business, business-to-government, etc.) or person-to-entity transactions (e.g., person-to-business, business-to-person, etc.) where financial institution customers include corporate or governmental entities. In such arrangements, the FI transaction circuit 222 may be further configured to enable electronic transactions for corporate and/or governmental entities in addition to individuals. In some arrangements, the FI transaction circuit 222 may be configured to require identification codes from authentication devices during an initial electronic transaction account set up process on behalf of a given entity, or periodically thereafter. For example, in some such arrangements, the recipient authentication device 238 may only need to be present at the recipient computing device 230 (e.g., associated with a business with an account at the recipient financial institution computing system 240) for an initial registration process for using an electronic transaction service provided by the FI transaction circuit 222. As such, after the recipient entity is registered, a user on behalf of the recipient entity may use the recipient computing device 230 to send and receive electronic transactions with or without the recipient authentication device 238. As another example, the FI transaction circuit 222 may be configured to require identification codes from authentication devices during a log in procedure (e.g., to access an electronic transaction service provided by the FI transaction circuit 222 on behalf of a governmental entity). After an authorized user logs in to the electronic transaction service (e.g., using the authentication device 102), the authorized user may proceed to send and receive transactions on behalf of the governmental entity regardless of whether the authentication device 102 is present.

Figure 3:
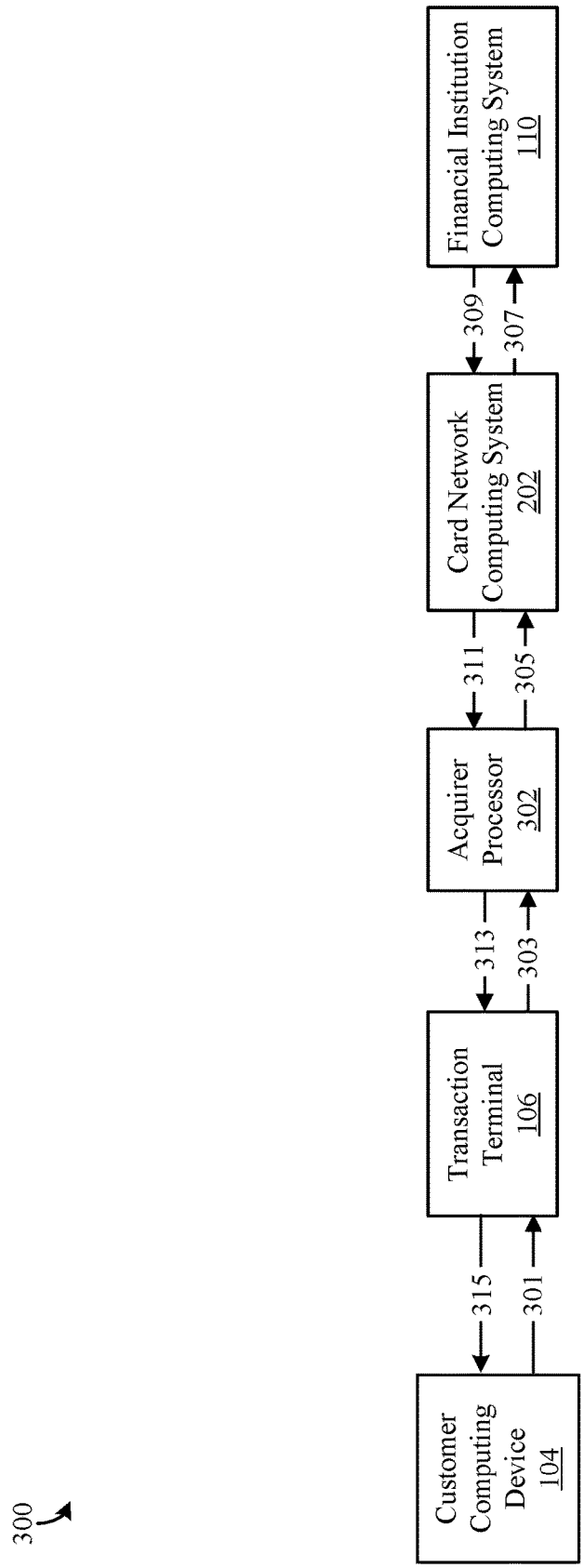
FIG. 3 is a block flow diagram of a payment transaction, according to an example embodiment.

FIG. 3 illustrates a process 300 that may be implemented by the system of FIGS. 1 and 2A. By way of example, FIG. 3 shows a mobile wallet transaction. When a user wishes to make a payment at a merchant, for example, the user may access the customer transaction circuit 212 by entering a PIN or other login credentials and then selecting a "transact" or similar button. For example, the user may be located at a merchant location and may wish to pay for a good or service. As another example, the user may be located away from the merchant location or be engaged in an online transaction.

At step 301, the customer computing device 104 may transmit transaction information including an identification code and a payment token to the transaction terminal 106 (e.g., using a QR code, NFC, wireless, Bluetooth, low energy Bluetooth, RFID, hypersonic, Wi-Fi, cellular 3G, 4G, GSM, LiFi, or other method). In some embodiments, the payment token is provisioned to the customer transaction circuit 212 in advance and is reused for many mobile wallet transactions. In other embodiments, the payment token is dynamically provisioned to the customer transaction circuit 212. For example, when the user selects the "transact" button, the customer transaction circuit 212 may send a request to the FI wallet circuit 224 which, in response, provisions a one-time payment token to the customer transaction circuit 212. In some arrangements, the authentication device 102 provides the identification code to the customer computing device 104 at each transaction.

At step 303, after receiving the transaction information, the transaction terminal 106 sends a corresponding transaction request to an acquirer processor computing system 302 for processing. Next, at step 305, the acquirer processor computing system 302 sends the transaction request to the card network computing system 202 for processing a payment. The card network computing system 202 detokenizes the payment token in the transaction request, thereby resulting in the actual card number (i.e., the PAN). At step 307, the card network computing system 202 sends the transaction request and the PAN to the financial institution computing system 110. The financial institution computing system 110 then processes the transaction request, for example, by authenticating the identification code, performing fraud checks, and approving the transaction based on the account status of the user (e.g., by confirming that the user has not exceed the credit limit of their credit card). The financial institution computing system 110 may then send an approval to the transaction terminal 106 via the card network computing system 202, the acquirer processor 112 (steps 309-313), and the payment to the merchant is made. Upon receiving the approval message the transaction terminal 106 may generate a receipt for the user. In some embodiments, the receipt may be sent to the customer computing device 104 electronically. In other embodiments, the receipt may be printed physically at the transaction terminal 106.

Figure 4:
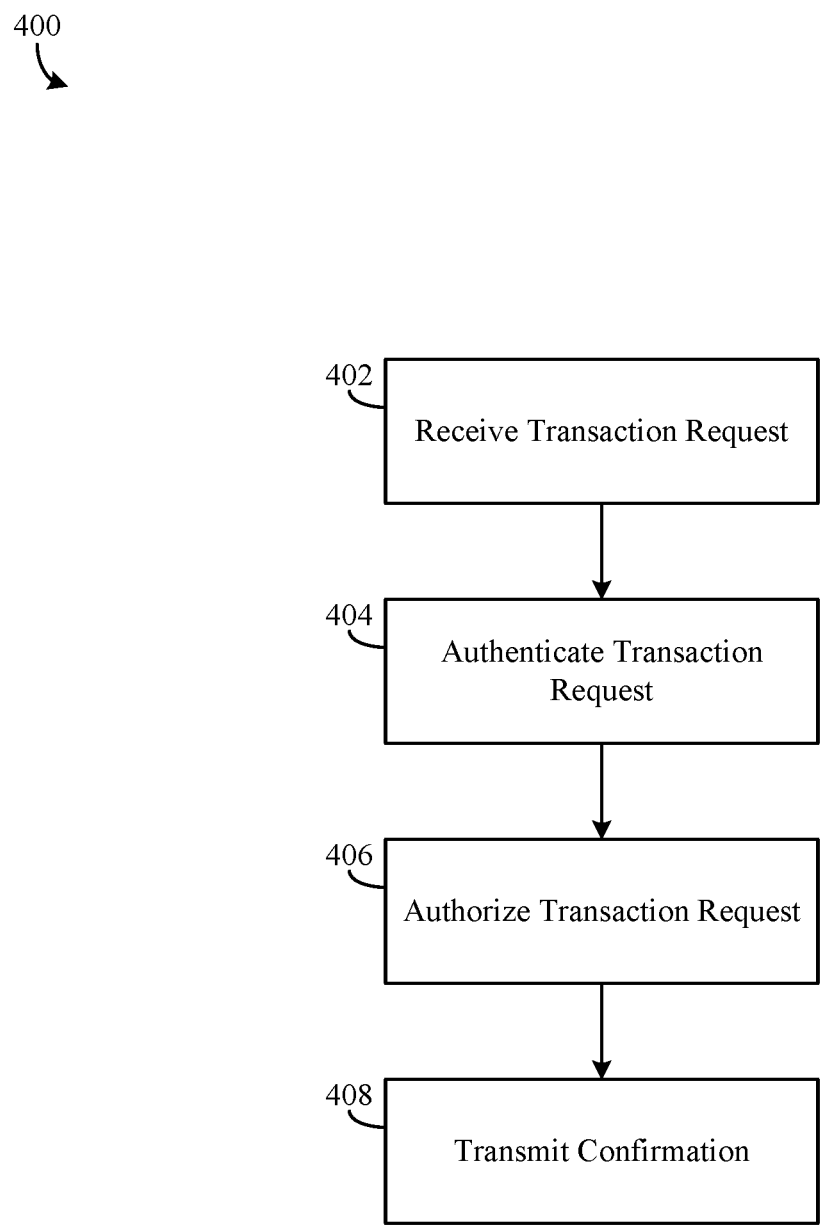
FIG. 4 is a flowchart of a method of authorizing a transaction request, according to an example embodiment.

Referring now to FIG. 4, a method 400 of authorizing payment transactions is shown. The method 400 is performed by processing and storage hardware at a financial institution computing system (e.g., financial institution computing system 110), as executed by one or more circuits configured to perform the functions described below.

At 402, a transaction request is received. The transaction request is received by an FI transaction circuit (e.g., the FI transaction circuit 222), over a network (e.g., the network 108) via an FI network circuit 228 (e.g., the FI network circuit 228). In various arrangements, the transaction request includes payment credentials and authentication information that includes at least an identification code corresponding to an authentication device (e.g., the authentication device 102). The transaction request may be assembled at a transaction terminal (e.g., the transaction terminal 106) after communicating with a customer computing device (e.g., the customer computing device 104) of a customer, or by a customer transaction circuit (e.g., the customer transaction circuit 212). The customer computing device receives an identification code from the authentication device. In one arrangement, the customer transaction circuit (e.g., the customer transaction circuit 212) at the customer computing device includes the identification code with a payment credential (e.g., a payment token) in transaction information, which the customer transaction circuit transmits to the transaction terminal. The transaction terminal assembles the transaction request using the transaction information (e.g., includes merchant information, a transaction amount, etc. in the transaction request), and transmits the transaction request over the network. In another arrangement, the customer computing device assembles the transaction information and the transaction request and transmits the transaction request over the network via a customer network circuit (e.g., the customer network circuit 210).

In some arrangements, the transaction request includes a payment token. In some such arrangements, the transaction request is received at a card network computing system (e.g., the card network computing system 202) for detokenization. A token management circuit (e.g., the token management circuit 206) cooperates with a token vault (e.g., the token vault 208) to retrieve a PAN corresponding to the payment token in the transaction request. The token management circuit then updates the transaction request to include the PAN, and transmits the transaction request to the financial institution computing system over the network. As such, in some arrangements, the financial institution computing system receives the transaction request from the card network computing system.

At 404, the transaction request is authenticated. In some arrangements, the transaction information includes an identification code, which the FI transaction circuit uses to authenticate the transaction request. Information sufficient to authenticate the transaction request may be stored in a customer database (e.g., the customer database 226) maintained at the financial institution computing system. In one arrangement, the customer database includes information relating to a plurality of identification codes. For example, the customer database may include an identification code associated with a specific authentication device and a specific customer. In some arrangements, identification codes are dynamic and change over certain intervals. In such arrangements, the customer database may include an identification code generation algorithm along with information relating to identification code update intervals (e.g., an update at every set interval of time, an update after a designated number of transaction information transmissions, etc.). A corresponding identification code generation algorithm and update interval may also be stored and used in an authentication device to generate the identification code in the transaction request received at 402. As such, the FI transaction circuit may be able to authenticate the transaction request by comparing the identification code received in the transaction request with identification code information in the customer database.

At 406, the transaction request is authorized. The FI transaction circuit may authorize the transaction request after performing one or more checks to determine that the transaction request was not fraudulently made and that the underlying transaction may otherwise be properly completed. In one aspect, the FI transaction circuit may cooperate with the customer database to determine whether the financial account contains sufficient funds to complete the transaction request. If the FI transaction circuit finds that no fraud indicators are present and that the transaction request may properly be made, the FI transaction circuit may authorize the transaction request (e.g., by causing funds from the financial account associated with the PAN to transfer to a merchant account). Alternatively, if the FI transaction circuit finds one or more fraud indicators, and/or that the transaction request cannot be properly made, the FI transaction circuit may deny the transaction request.

At 408, a confirmation is transmitted. The FI transaction circuit may prepare the confirmation to include information relating to whether the transaction request was authorized. The FI transaction circuit transmits the confirmation over the network to the transaction terminal, which in some arrangements routes the confirmation to the customer computing device.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A transaction system, the transaction system comprising:
   an authentication device;
   a customer computing device, communicably coupled to the authentication device; and
   a financial institution computing system comprising:
      a network circuit enabling the financial institution computing system to exchange information over a network;
      a customer database storing financial information and identification code information for a plurality of customers;
      a token vault storing and managing token values, financial accounts, and corresponding mapping data which associates the token values with the financial accounts; and
      a transaction circuit;
   the transaction system configured to:
      receive, by the financial institution computing system from the customer computing device over the network via the network circuit, a request to provision a single use token value based on a customer input on the customer computing device;
      provision, by the financial institution computing system, the single use token value;
      generate, by the authentication device, a first identification code;
      measure biometric data of an authorized user associated with the authentication device, and determine that the authorized user is in possession of the authentication device by comparing the measured biometric data with stored biometric data;

encrypt, by the authentication device, the first identification code using an asymmetrical key;

in response to determining that that the authorized user is in possession of the authentication device, transmit, by the authentication device, the encrypted first identification code to the customer computing device;

transmit, by the customer computing device, transaction information including the encrypted first identification code and the single use token value to a transaction terminal;

receive, by the financial institution computing system from the transaction terminal over the network via the network circuit, a transaction request specifying the single use token value and including the encrypted first identification code;

detokenize, by the financial institution computing system, the single use token value;

authenticate, by the financial institution computing system using the first identification code after being decrypted, the single use token value, the token vault, and the customer database, the transaction request by determining that the first identification code is associated the authorized user and that an authorized financial account is associated with the single use token value specified in the transaction request;

authorize, by the financial institution computing system based at least in part on whether the transaction request is authenticated and information in the customer database, the transaction request; and transmit, by the financial institution computing system, a confirmation to the transaction terminal over the network via the network circuit.

2. The transaction system of claim 1, wherein the authentication device encrypts the first identification code using a first public key stored at the authentication device, wherein the financial institution computing system is further configured to decrypt the first identification code in the transaction request using a first private key stored at the customer database, wherein the first private key is specific to the authorized user and complementary to the first public key, and wherein the transaction request is authenticated if the first identification code decrypted by the financial institution computing system matches identification code information associated with the authorized user that is stored in the customer database.

3. The transaction system of claim 1, wherein the authentication device authenticates the customer computing device before providing the first identification code to the customer computing device, and wherein the financial institution computing system receives the transaction request after the authentication device authenticates the customer computing device.

4. The transaction system of claim 1, wherein the first identification code is a static code and the identification code information in the customer database includes a plurality of static codes associated with a plurality of authorized users of a plurality of financial accounts, and wherein the financial institution computing system authorizes the transaction request if the first identification code is associated with the authorized user of the financial account.

5. The transaction system of claim 1, wherein the first identification code is a dynamic code and the identification code information in the customer database includes at least one dynamic code generation algorithm and at least one code generation interval associated with the authorized user, wherein financial institution computing system authenticates the transaction request by generating identification codes pursuant to the at least one dynamic code generation algorithm at the at least one code generation interval and matching the first identification code included in the transaction request with one of the generated identification codes, and wherein the financial institution computing system authorizes the transaction request if the one of the generated identification codes is associated with the authorized user.

6. The transaction system of claim 5, wherein the at least one code generation interval is a time interval.

7. The transaction system of claim 5, wherein the at least one code generation interval is based on a number of transaction requests transmitted to the financial institution computing system by the authorized user.

8. The transaction system of claim 1, further comprising a wallet circuit maintaining a plurality of mobile wallet accounts in the customer database, wherein each of the plurality of mobile wallet accounts includes at least one approved method of payment associated with a respective user, and wherein the financial institution computing system authorizes the transaction request if the transaction request specifies an approved method of payment for the authorized user and the first identification code is associated with the authorized user.

9. A method of authorizing transaction requests, the method comprising:

receiving, by a financial institution computing system from a customer device over a network via a network circuit, a request to provision a single use token value based on a customer input on a customer computing device;

provisioning, by the financial institution computing system, the single use token value;

generating, by an authentication device communicably coupled to the customer computing device, a first identification code;

measuring, by the authentication device, biometric data of an authorized user and determining that the authorized user is in possession of the authentication device by comparing the measured biometric data with stored biometric data;

encrypting, by the authentication device, the first identification code using an asymmetrical key;

in response to determining that that the authorized user is in possession of the authentication device, transmitting, by the authentication device, the encrypted first identification code to the customer computing device;

transmitting, by the customer computing device, transaction information including the encrypted first identification code and the single use token value to a transaction terminal;

receiving, by the financial institution computing system from the transaction terminal over the network via the network circuit, a transaction request specifying the single use token value and including the encrypted first identification code generated by the authentication device;

detokenizing, by the financial institution computing system, the single use token value;

authenticating, by the financial institution computing system using the first identification code after being decrypted, the single use token value, a token vault, and a customer database storing financial information and identification code information for a plurality of customers, the transaction request by determining whether the first identification code is associated with the authorized user and an authorized financial account is associated with the single use token value specified in the transaction request;

authorizing, by the financial institution computing system, based at least in part on whether the transaction request is authenticated and information in the customer database, the transaction request; and transmitting, by the financial institution computing system via the network circuit, a confirmation to the transaction terminal over the network.

10. The method of claim 9, wherein the authentication device encrypts the first identification code using a first public key stored at the authentication device, wherein the financial institution computing system is further configured to decrypt the first identification code in the transaction request using a first private key stored at the customer database, wherein the first private key is specific to the authorized user and complementary to the first public key, and wherein the transaction request is authenticated if the first identification code decrypted by the financial institution computing system matches identification code information associated with the authorized user that is stored in the customer database.

11. The method of claim 9, wherein the authentication device authenticates the customer computing device before providing the first identification code to the customer computing device, and wherein the financial institution computing system receives the transaction request after the authentication device authenticates the customer computing device.

12. A non-transitory computer readable media having computer-executable instructions embodied therein that, when executed by an authentication device, a customer computing device coupled to the authentication device, and a financial institution computing system of a transaction system, causes the transaction system to perform operations to authorize transaction requests, the operations comprising:

receiving, by the financial institution computing system from the customer computing device over a network via a network circuit, a request to provision a single use token value based on a customer input on the customer computing device;

provisioning, by the financial institution computing system, the single use token value;

generating, by the authentication device, a first identification code;

measuring, by the authentication device, biometric data of an authorized user, and determining that the authorized user is in possession of the authentication device by comparing the measured biometric data with stored biometric data;

encrypting, by the authentication device, the first identification code using an asymmetrical key;

in response to determining that that the authorized user is in possession of the authentication device, transmitting, by the authentication device, the encrypted first identification code to the customer computing device;

transmitting, by the customer computing device, transaction information including the encrypted first identification code and the single use token value to a transaction terminal;

receiving, by the financial institution computing system from the transaction terminal over the network via the network circuit, a transaction request specifying the single use token value and including the encrypted first identification code;

detokenizing, by the financial institution computing system, the single use token value;

authenticating, by the financial institution computing system using the first identification code after being decrypted, the single use token value, a token vault, and a customer database storing financial information and identification code information for a plurality of customers, the transaction request by determining that the first identification code is associated with the authorized user and that an authorized financial account is associated with the token value specified in the transaction request;

authorizing, by the financial institution computing system based at least in part on whether the transaction request is authenticated and information in the customer database, the transaction request; and transmitting, by the financial institution computing system via the network circuit, a confirmation to the transaction terminal over the network.

13. The media of claim 12, wherein the authentication device encrypts the first identification code using a first public key stored at the authentication device, wherein the financial institution computing system is further configured to decrypt the first identification code in the transaction request using a first private key stored at the customer database, wherein the first private key is specific to the authorized user and complementary to the first public key, and wherein the transaction request is authenticated if the first identification code decrypted by the financial institution computing system matches identification code information associated with the authorized user that is stored in the customer database.

14. The media of claim 12, wherein the authentication device authenticates the customer computing device before providing the first identification code to the customer computing device, and wherein the financial institution computing system receives the transaction request after the authentication device authenticates the customer computing device.

* * * * *